US011999870B2

(12) United States Patent
Smith et al.

(10) Patent No.: US 11,999,870 B2
(45) Date of Patent: Jun. 4, 2024

(54) BUILDING PANEL COATINGS

(71) Applicant: ARMSTRONG WORLD INDUSTRIES, INC., Lancaster, PA (US)

(72) Inventors: David A. Smith, York, PA (US); Anna G. Fazzini, Grove City, OH (US); Dino J. Capers, Lititz, PA (US); Christian Busque, Lititz, PA (US)

(73) Assignee: AWI Licensing LLC, Wilmington, DE (US)

( * ) Notice: Subject to any disclaimer, the term of this patent is extended or adjusted under 35 U.S.C. 154(b) by 256 days.

(21) Appl. No.: 17/538,678

(22) Filed: Nov. 30, 2021

(65) Prior Publication Data

US 2022/0177710 A1   Jun. 9, 2022

Related U.S. Application Data

(60) Provisional application No. 63/120,870, filed on Dec. 3, 2020.

(51) Int. Cl.
*C09D 5/18* (2006.01)
*C09D 5/02* (2006.01)
*C09D 7/45* (2018.01)
*C09D 7/61* (2018.01)
*C09D 7/65* (2018.01)
*C09D 131/04* (2006.01)
*E04B 9/04* (2006.01)
(Continued)

(52) U.S. Cl.
CPC ............. *C09D 5/022* (2013.01); *C09D 5/025* (2013.01); *C09D 5/027* (2013.01); *C09D 5/028* (2013.01); *C09D 5/18* (2013.01); *C09D 7/45* (2018.01); *C09D 7/61* (2018.01); *C09D 7/65* (2018.01); *C09D 131/04* (2013.01); *E04B 9/04* (2013.01); *E04C 2/02* (2013.01); *E04B 9/28* (2013.01)

(58) Field of Classification Search
CPC ...... C08K 3/013; C08K 3/014; C09D 131/04; C09D 191/08; C09D 5/022; C09D 5/025; C09D 5/027; C09D 5/028; C09D 5/18; C09D 7/43; C09D 7/45; C09D 7/61; C09D 7/65; E04B 9/04; E04B 9/24; E04B 9/28; E04C 2/02; E04C 2/526
See application file for complete search history.

(56) References Cited

U.S. PATENT DOCUMENTS 9,702,142 B1    7/2017   Wang
10,435,888 B2   10/2019  Wang
2016/0069076 A1  3/2016  Holdridge
(Continued)

FOREIGN PATENT DOCUMENTS

CN    106700882 A    5/2017
CN    111073422 A    4/2020
(Continued)

OTHER PUBLICATIONS

International Search Report for parent PCT/2021/061240 dated Apr. 4, 2022.

*Primary Examiner* — Lawrence D Ferguson
(74) *Attorney, Agent, or Firm* — Patrick Sheldrake

(57) ABSTRACT

Described herein are panel coating compositions, building panel and a ceiling panel assembly having such coating compositions. The coating compositions are useful in obtaining stable and splotch-free finished paint on large panels.

19 Claims, 7 Drawing Sheets

(51) Int. Cl.
*E04C 2/02* (2006.01)
*E04B 9/28* (2006.01)

(56) References Cited

U.S. PATENT DOCUMENTS

2019/0136516 A1* 5/2019 Hughes .................... B32B 3/26
2020/0299902 A1 9/2020 Deeter

FOREIGN PATENT DOCUMENTS

| WO | WO 2013-156223 A1 | 10/2013 |
| WO | WO 2018-222825 A1 | 12/2018 |

* cited by examiner ically hindered by use of water repellant coatings which may yield splotchy and/or streaky results.

BUILDING PANEL COATINGS

CROSS-REFERENCE TO RELATED APPLICATIONS

This application claims the benefit of U.S. Provisional Application No. 63/120,870, filed on Dec. 3, 2020. The disclosure of the above application(s) is (are) incorporated herein by reference.

BACKGROUND

Building panel systems are installed into room environments to help control noise as well as enhance the aesthetic appeal of those room environments. These systems may comprise one or more building panels having specific aesthetic properties that help contribute to the appeal of the room environment. However, aesthetic properties may be hindered by use of water repellant coatings which may yield splotchy and/or streaky results.

Thus, a need exists for a building panel coating that can impart desired aesthetic appeal.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered panel coating compositions which provide for aesthetic properties. Such aesthetics may include producing a stable coating that yields a visual of uniform mattness when applied. Such aesthetic properties may also include producing a stable coating with non-streaky effects. Such compositions are particularly beneficial for use on large panels.

Thus, in one aspect, the invention is directed to a building panel coating composition comprising calcium carbonate, aluminum hydroxide, zinc borate, a rheology modifier, a defoamer, a dispersing agent, a whitening pigment, and an anionic wax emulsion. In certain embodiments, the rheology modifier is non-ionic, water-soluble hydroxyethylcellulose surface-treated with glyoxal. In certain embodiments, the rheology modifier is present in an amount of about 0.002% to about 0.08%, about 0.002% to about 0.04%, about 0.002% to about 0.01%, or about 0.002% to about 0.008%, by weight of the composition. In certain embodiments, the defoamer is a polyether siloxane copolymer. In certain embodiments, the polyether siloxane copolymer comprises fumed silica. In certain embodiments, the defoamer is present in an amount of about 0.08% to about 0.3%, about 0.1% to about 0.25%, or about 0.1% to about 0.2%, by weight of the composition. In certain embodiments, the dispersing agent is a nonionic dispersant copolymer. In certain embodiments, the dispersing agent is present in an amount of about 1.0% to about 3.0%, about 1.0% to about 2.0%, or about 1.0% to about 1.5%, by weight of the composition. In certain embodiments, the whitening pigment is titanium dioxide. In certain embodiments, the whitening pigment is present in an amount of about 15% to about 30%, about 18% to about 25%, or about 18% to about 22%, by weight of the composition. In certain embodiments, the anionic wax emulsion comprises paraffin, polyethylene, or a combination thereof. In certain embodiments, the anionic wax emulsion is present in an amount of about 5% to about 30%, about 5% to about 20%, or about 7% to about 15%, by weight of the composition.

In other aspects, the invention is directed towards a building panel comprising a body having an upper surface opposite a lower surface and at least one side surface extending between the upper surface and the lower surface; a water repellant coating adjacent at least to the upper surface and lower surface, the water repellant coating comprising the building panel coating according to any one of the embodiments described above. In certain embodiments, the building panel is selected from a wall or ceiling panel. In certain embodiments, the body comprises any one of fiberboard, wood, metal, brick, plastic, fabric, fibrous sheet, glass, ceramic, concrete, plastic film/sheet, paper, fiberglass, mineral fiber sheet, drywall. In certain embodiments, the building panel length and width is at least 3 ft×6 ft, at least 3.5 ft×7 ft, or at least 4 ft×8 ft. In certain embodiments, the building panel exhibit an NRC value of at least 0.5.

In other aspects, the invention is directed towards a ceiling panel assembly comprising a ceiling panel comprising a first major surface opposite a second major surface and at least one side surface extending between the first major surface and the second major surface; a water repellant coating adjacent at least to the first major surface and the second major surface, the water repellant coating comprising calcium carbonate, aluminum hydroxide, zinc borate, a rheology modifier, a defoamer, a dispersing agent, a whitening pigment, and an anionic wax emulsion; a mounting bracket comprising a mounting angle comprising a first lip portion extending from a first vertical portion, the first lip portion comprising a first horizontal portion and a second vertical portion extending downward from the first horizontal portion; a base plate having an upper surface opposite a lower surface, the base plate comprising a second lip portion; and a hook member extending upward from the upper surface of the base plate; and wherein base plate is coupled to the first lip portion, and the first lip portion and the second lip portion are complimentary in shape. In certain embodiments, the rheology modifier is non-ionic, water-soluble hydroxyethylcellulose surface-treated with glyoxal. In certain embodiments, the rheology modifier is present in an amount of about 0.002% to about 0.08%, about 0.002% to about 0.04%, about 0.002% to about 0.01%, or about 0.002% to about 0.008%, by weight of the composition. In certain embodiments, the defoamer is a polyether siloxane copolymer. In certain embodiments, the polyether siloxane copolymer comprises fumed silica. In certain embodiments, the defoamer is present in an amount of about 0.08% to about 0.3%, about 0.1% to about 0.25%, or about 0.1% to about 0.2%, by weight of the composition. In certain embodiments, the dispersing agent is a nonionic dispersant copolymer. In certain embodiments, the dispersing agent is present in an amount of about 1.0% to about 3.0%, about 1.0% to about 2.0%, or about 1.0% to about 1.5%, by weight of the composition. In certain embodiments, the whitening pigment is titanium dioxide. In certain embodiments, the whitening pigment is present in an amount of about 15% to about 30%, about 18% to about 25%, or about 18% to about 22%, by weight of the composition. In certain embodiments, the anionic wax emulsion comprises paraffin, polyethylene, or a combination thereof. In certain embodiments, the anionic wax emulsion is present in an amount of about 5% to about 30%, about 5% to about 20%, or about 7% to about 15%, by weight of the composition. In certain embodiments, the building panel is selected from a wall or ceiling panel. In certain embodiments, the building panel comprises any one of fiberboard, wood, metal, brick, plastic, fabric, fibrous sheet, glass, ceramic, concrete, plastic film/sheet, paper, fiberglass, mineral fiber sheet, drywall. In certain embodiments, the building panel length and width is at least 3 ft×6 ft, at least 3.5 ft×7 ft, or at least 4 ft×8 ft. In certain embodiments, the invention is directed towards a ceiling system comprising a support frame; at least one of the building panels as described herein; and wherein the building panel is supported within the ceiling system by the support frame.

In other aspects, the invention is directed towards a ceiling system comprising a support frame; at least one of the building panel assembly's as described herein; and wherein the building panel is supported within the ceiling system by the support frame.

In other aspects, the invention is directed towards a coating composition comprising a liquid carrier; and a solid blend comprising calcium carbonate; aluminum hydroxide; zinc borate; a rheology modifier; a defoamer; a dispersing agent; a pigment; and an anionic wax emulsion; and wherein the liquid carrier is present in an amount ranging from 5 wt. % to 45 wt. % based on the total weight of the coating composition. In certain embodiments, the rheology modifier is non-ionic, water-soluble hydroxyethylcellulose surface-treated with glyoxal. In certain embodiments, the rheology modifier is present in the solid blend in an amount of about 0.002% to about 0.08%, about 0.002% to about 0.04%, about 0.002% to about 0.01%, or about 0.002% to about 0.008%, by weight of the solid blend. In certain embodiments, the defoamer is a polyether siloxane copolymer. In certain embodiments, the polyether siloxane copolymer comprises fumed silica. In certain embodiments, the defoamer is present in an amount of about 0.08% to about 0.3%, about 0.1% to about 0.25%, or about 0.1% to about 0.2%, by weight of the solid blend. In certain embodiments, the dispersing agent is a nonionic dispersant copolymer. In certain embodiments, the dispersing agent is present in an amount of about 1.0% to about 3.0%, about 1.0% to about 2.0%, or about 1.0% to about 1.5%, by weight of the solid blend. In certain embodiments, the pigment is titanium dioxide. In certain embodiments, the pigment is present in an amount of about 15% to about 30%, about 18% to about 25%, or about 18% to about 22%, by weight of the solid blend. In certain embodiments, the anionic wax emulsion comprises paraffin, polyethylene, or a combination thereof. In certain embodiments, the anionic wax emulsion is present in an amount of about 5% to about 30%, about 5% to about 20%, or about 7% to about 15%, by weight of the solid blend. In certain embodiments, the liquid carried comprises water.

In other aspects, the invention is directed towards a method of coating a building panel substrate comprising: applying the coating composition as described above to a substrate; and drying the coating composition such that the liquid carrier is removed from the substrate. In certain embodiments, the substrate is a porous structure and the building panel is an acoustical ceiling panel. In certain embodiments, the porous structure comprises a fibrous material. In certain embodiments, the building panel exhibits an NRC value of at least 0.5.

In other aspects, the invention is directed towards a wall covering system comprising a support structure; at least one building panel comprising a body having an upper surface opposite a lower surface and at least one side surface extending between the upper surface and the lower surface; and a water repellant coating adjacent at least to the upper surface and lower surface, the water repellant coating comprising calcium carbonate, aluminum hydroxide, zinc borate, a rheology modifier, a defoamer, a dispersing agent, a whitening pigment, and an anionic wax emulsion. In certain embodiments, the rheology modifier is non-ionic, water-soluble hydroxyethylcellulose surface-treated with glyoxal. In certain embodiments, the defoamer is a polyether siloxane copolymer. In certain embodiments, the polyether siloxane copolymer comprises fumed silica. In certain embodiments, the dispersing agent is a nonionic dispersant copolymer. In certain embodiments, the whitening pigment is titanium dioxide. In certain embodiments, the anionic wax emulsion comprises paraffin, polyethylene, or a combination thereof. In certain embodiments, the building panel comprises any one of fiberboard, wood, metal, brick, plastic, fabric, fibrous sheet, glass, ceramic, concrete, plastic film/sheet, paper, fiberglass, mineral fiber sheet, drywall. In certain embodiments, the building panel length and width is at least 3 ft×6 ft, at least 3.5 ft×7 ft, or at least 4 ft×8 ft. In certain embodiments, the building panel exhibit an NRC value of at least 0.5.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The detailed description of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
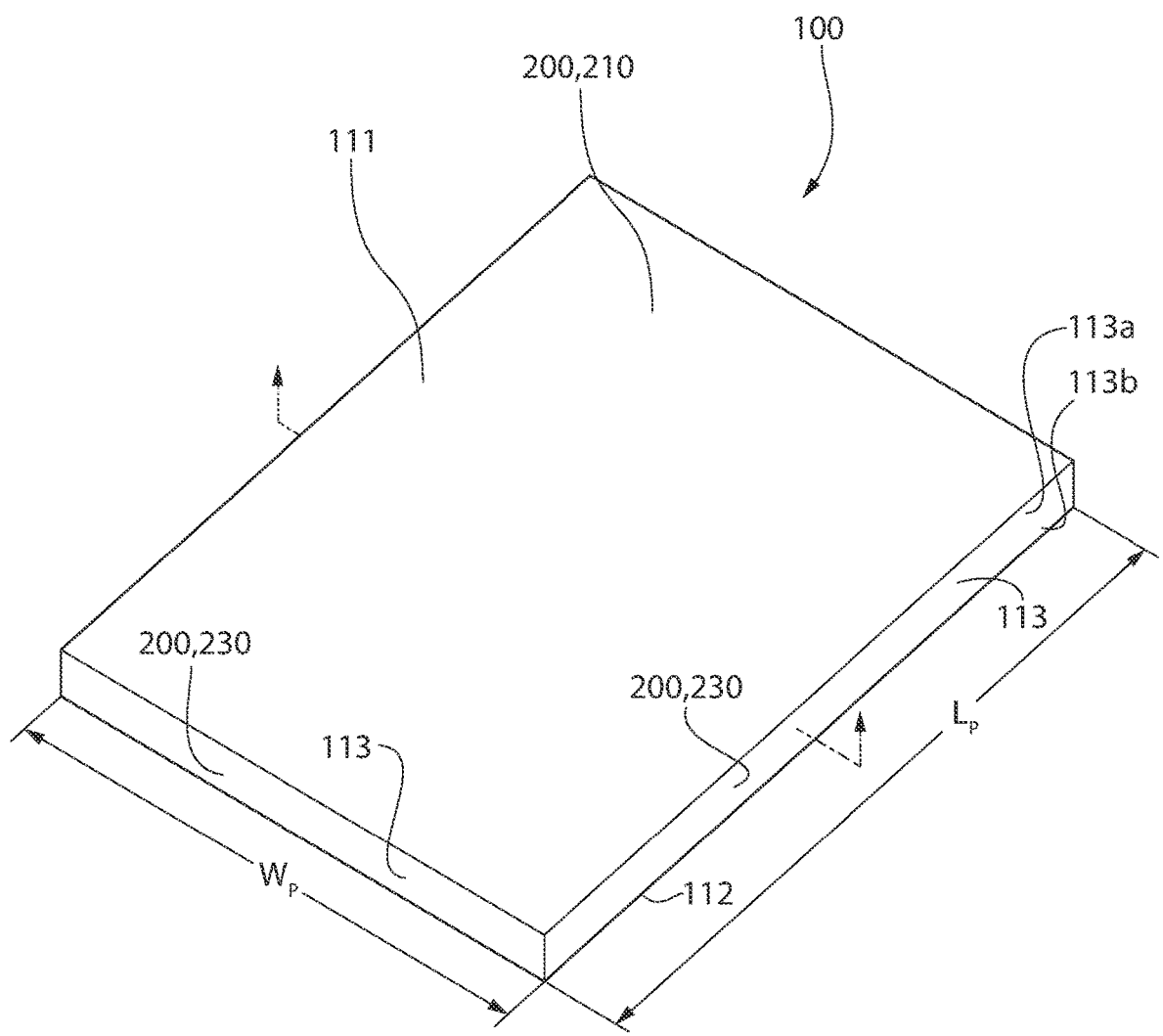
FIG. 1 is top perspective view of a coated building panel according to the present invention.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Reference to a molecule, or to molecules, being present at a "wt. %" refers to the amount of that molecule, or molecules, present in the composition based on the total weight of the composition.

The phrase "dry-weight" refers to the weight of a referenced component without the weight of any carrier. Thus, when calculating the weight percentages of components in the dry-state, the calculation should be based solely on the solid components (e.g., binder, filler, hydrophobic component, fibers, etc.) and should exclude any amount of residual carrier (e.g., water, VOC solvent) that may still be present from a wet-state, which will be discussed further herein. According to the present invention, the phrase "dry-state" may also be used to indicate a component that is substantially free of a carrier, as compared to the term "wet-state," which refers to that component still containing various amounts of carrier—as discussed further herein.

The term "liquid phase" refers to water being in the liquid phase under atmospheric pressure (1 atm) at room temperature (about 23° C.)—as referred to as "liquid water." The term "vapor phase" refers to air or water being in the gaseous phase under atmospheric pressure (1 atm) at room temperature (about 23° C.)—wherein water in the vapor phase may be referred to as "water vapor."

According to the present application, use of the term "about" in conjunction with a numeral value refers to a value that may be +/−5% of that numeral. As used herein, the term "substantially free" is intended to mean an amount less than about 5.0 weight %, less than 3.0 weight %, 1.0 wt. %; preferably less than about 0.5 wt. %, and more preferably less than about 0.25 wt. % of the composition.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

Figure 2:
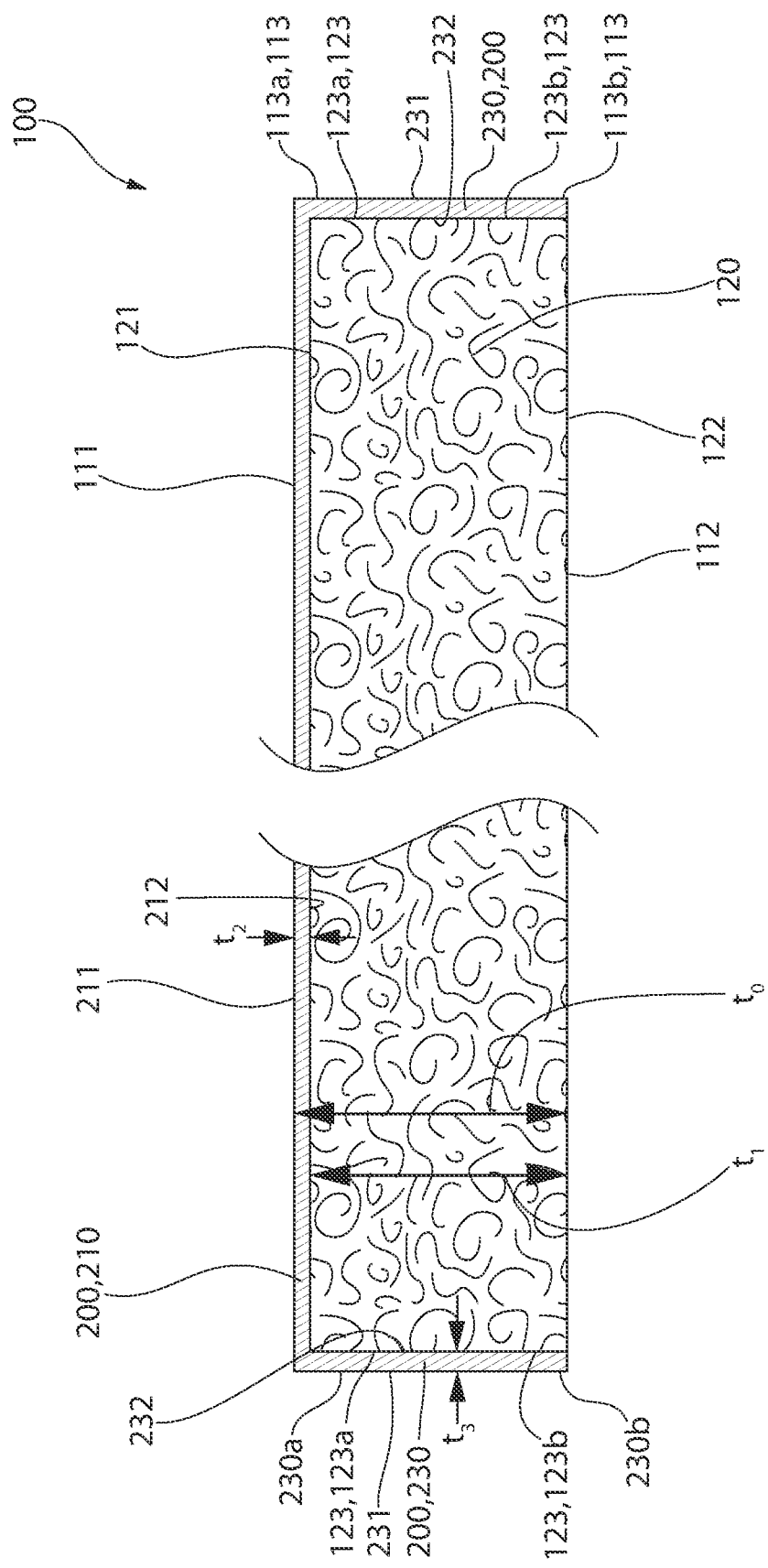
FIG. 2 is a cross-sectional view of the coated building panel according to the present invention, the cross-sectional view being along the II line set forth in FIG. 1.

Referring to FIGS. 1 and 2, in certain embodiments, the present invention includes a coated building panel 100 comprising a first major surface 111 opposite a second major surface 112 and a side surface 113 that extends between the first major surface 111 and the second major surface 112, thereby defining a perimeter of the building panel 100. The side surface 113 may comprise an upper portion 113a and a lower portion 113b, wherein the upper portion 113a is adjacent to the first major surface 111 and the lower portion 113b is adjacent to the second major surface 112. In certain embodiments, the building panel 100 is a wall panel. In other embodiments, the building panel 100 is a ceiling panel.

In certain embodiments, the building panel 100 may form part of a monolithic structure. As described herein, the monolithic structure may comprise at least one coated building panel 100. The term "monolithic" refers to uniform and continuous structure—i.e., uninterrupted. As discussed in greater detail herein, the overall monolithic structure 100 of the present invention may be formed from a combination of multiple separate components. The resulting monolithic structure 100 may still constitute as monolithic because, in combination, at least portions of the components form a continuous and uninterrupted structure. Therefore, the term "monolithic structure" according to the present invention may not require that the entire structure be uniform and continuous so long as at least a portion of the structure is uniform and continuous.

The building panel 100 of the present invention may have a panel thickness $t_o$ as measured from the first major surface 111 to the second major surface 112. The panel thickness $t_o$ may range from about 12 mm to about 40 mm—including all values and sub-ranges there-between. The building panel 100 may have a length ($L_P$) ranging from about 30 cm to about 310 cm—including all values and sub-ranges there-between. The building panel 100 may have a width (WP) ranging from about 10 cm to about 310 cm—including all values and sub-ranges there-between. In certain embodiments, the building panel has a width of about 61 cm and a length of about 122 cm, or about 61 cm×about 122 cm. In certain embodiments, the building panel is a large building panel. For example, the building panel may have a width of at least 91 cm and a length of at least 91 cm. In certain embodiments, the building panel has a width of at least about 121 cm and a length of at least about 243 cm.

The building panel 100 comprises a body 120 and a surface coating 200 applied thereto—as discussed further herein. The body 120 comprises an upper surface 121 opposite a lower surface 122 and a body side surface 123 that extends between the upper surface 121 and the lower surface 122, thereby defining a perimeter of the body 120. The body 120 may have a body thickness $t_1$ that extends from the upper surface 121 to the lower surface 122. The body thickness $t_1$ may range from about 12 mm to about 40 mm—including all values and sub-ranges there-between. The body 120 may be comprised of a binder and fibers. In some embodiments, the body 120 may further comprise a filler and/or additive.

The body 120 of the building panel 100 may be porous, thereby allowing airflow through the body 120 between the upper surface 121 and the lower surface 122. According to the present invention, the term "porous" refers to the panel body 120 being porous enough to allow for enough airflow through the panel 100 (under atmospheric conditions) and the resulting monolithic structure, if any, to function as an acoustic panel body having properties related to noise reduction and sound attenuation properties.

Specifically, the panel body 120 of the present invention may have a porosity ranging from about 60% to about 98%—including all values and sub-ranges there between. In a preferred embodiment, the panel body 120 has a porosity ranging from about 75% to 95% —including all values and sub-ranges there between.

According to the embodiments where the panel body 120 is formed from binder and fibers, porosity may be calculated by the following equation:

$$\% \text{ Porosity} = [V_{Total} - (V_{Binder} + VF + VHC + V_{Filler})]/V_{Total}$$

Where $V_{Total}$ refers to the total volume of the panel body 120 defined by the upper surface 121, the lower surface 122, and the side surfaces 123 of the panel body 120. $V_{Binder}$ refers to the total volume occupied by the binder in the body 120. VF refers to the total volume occupied by the fibers in the panel body 120. $V_{Filler}$ refers to the total volume occupied by the filler in the panel body 120. VHC refers to the total volume occupied by the hydrophobic component in the panel body 120. Thus, the % porosity represents the amount of free volume within the panel body 120.

The panel body 120 of the present invention may exhibit sufficient airflow for the panel body 120 to have the ability to reduce the amount of reflected sound in an active room environment 2. The reduction in amount of reflected sound in an active room environment 2 is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The panel body 120 of the present invention preferably exhibits an NRC of at least about 0.5. In certain embodiments, the panel body 120 may have an NRC ranging from about 0.60 to about 0.99—including all value and sub-ranges there-between.

In addition to reducing the amount of reflected sound in a single active room environment 2, the panel body 120 of the present invention may also be able to exhibit superior sound attenuation—which is a measure of the sound reduction between an active room environment 2 and a plenary space 3. The ASTM has developed test method E1414 to standardize the measurement of airborne sound attenuation between room environments 2 sharing a common plenary space 3. The rating derived from this measurement standard is known as the Ceiling Attenuation Class (CAC). Ceiling materials and systems having higher CAC values have a greater ability to reduce sound transmission through the plenary space 3—i.e. sound attenuation function. In certain embodiments, the panel body 120 may exhibit a CAC value of 30 or greater, preferably 35 or greater. Such panel bodies are known in the art.

Non-limiting examples of binder useful to make up the body 120 may include a starch-based polymer, polyvinyl alcohol (PVOH), a latex, polysaccharide polymers, cellulosic polymers, protein solution polymers, an acrylic polymer, polymaleic anhydride, epoxy resins, or a combination of two or more thereof. Non-limiting examples of latex binder may include a homopolymer or copolymer formed from the following monomers: vinyl acetate (i.e., polyvinyl acetate), vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder useful to make up the body 120 is selected from the group consisting of aqueous lattices of polyvinyl acetate, polyvinyl acrylic, polyurethane, polyurethane acrylic, polystyrene acrylic, epoxy, polyethylene vinyl chloride, polyvinylidene chloride, and polyvinyl chloride.

Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate. The filler may be present in an amount ranging from about 25 wt. % to about 99 wt. % based on the total weight of the surface coating 200—including all values and sub-ranges there-between.

Non-limiting examples of additive include defoamers, wetting agents, biocides, dispersing agents, flame retardants, and the like. The additive may be present in an amount ranging from about 0.01 wt. % to about 30 wt. % based on the total weight of the coating 200—including all values and sub-ranges there-between.

Non-limiting examples of fibers useful to make up the body may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof. The fibers may be present in an amount ranging from about 5 wt. % to about 99 wt. % based on the total dry weight of the body 120—including all values and sub-ranges there-between.

The surface coating 200 may comprise an upper surface 211 opposite a lower surface 212. The coating 200 has a face coating thickness $t_2$—as measured from the upper surface 211 to the lower surface 212 of the surface coating 200. The face coating thickness $t_2$ may range from about 200 μm (micron) to about 500 μm—including all thicknesses and sub-ranges there-between. The lower surface 212 of the coating 200 may be in direct contact with the upper surface 121 of the body 120. The upper surface 211 of the face coating 210 may form at least a portion of the first major surface 111 of the building panel 100.

Although not shown, the building panel 100 of the present invention may further comprise a non-woven scrim. The non-woven scrim may comprise an upper surface opposite a lower surface. The lower surface of the non-woven scrim may be positioned immediately adjacent to and in direct contact with the upper surface 121 of the body 120. The coating 200 may be applied to the non-woven scrim such that the lower surface 212 of the coating 200 is in direct contact with the upper surface of the non-woven scrim.

Figure 3:
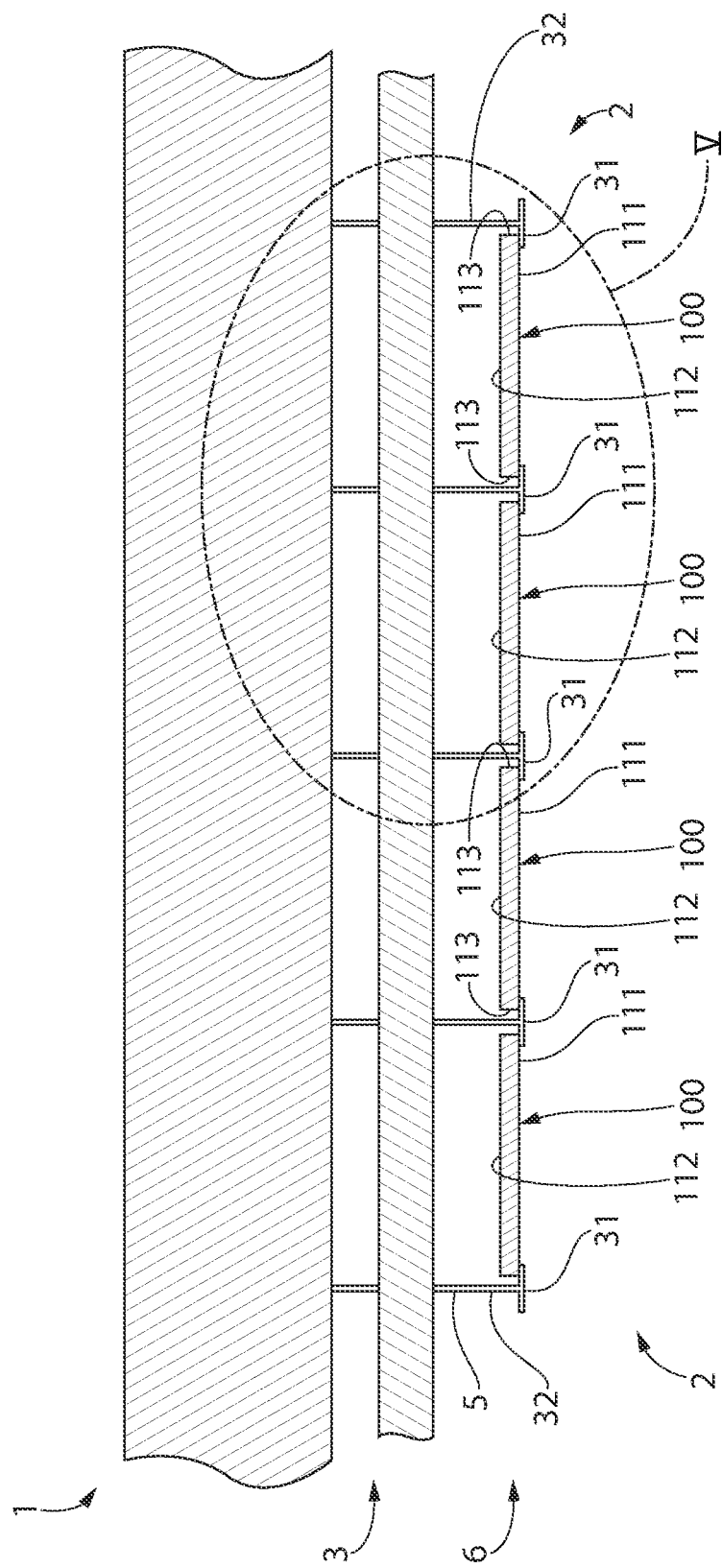
FIG. 3 is a ceiling system comprising the coated building panel of the present invention.
Figure 4:
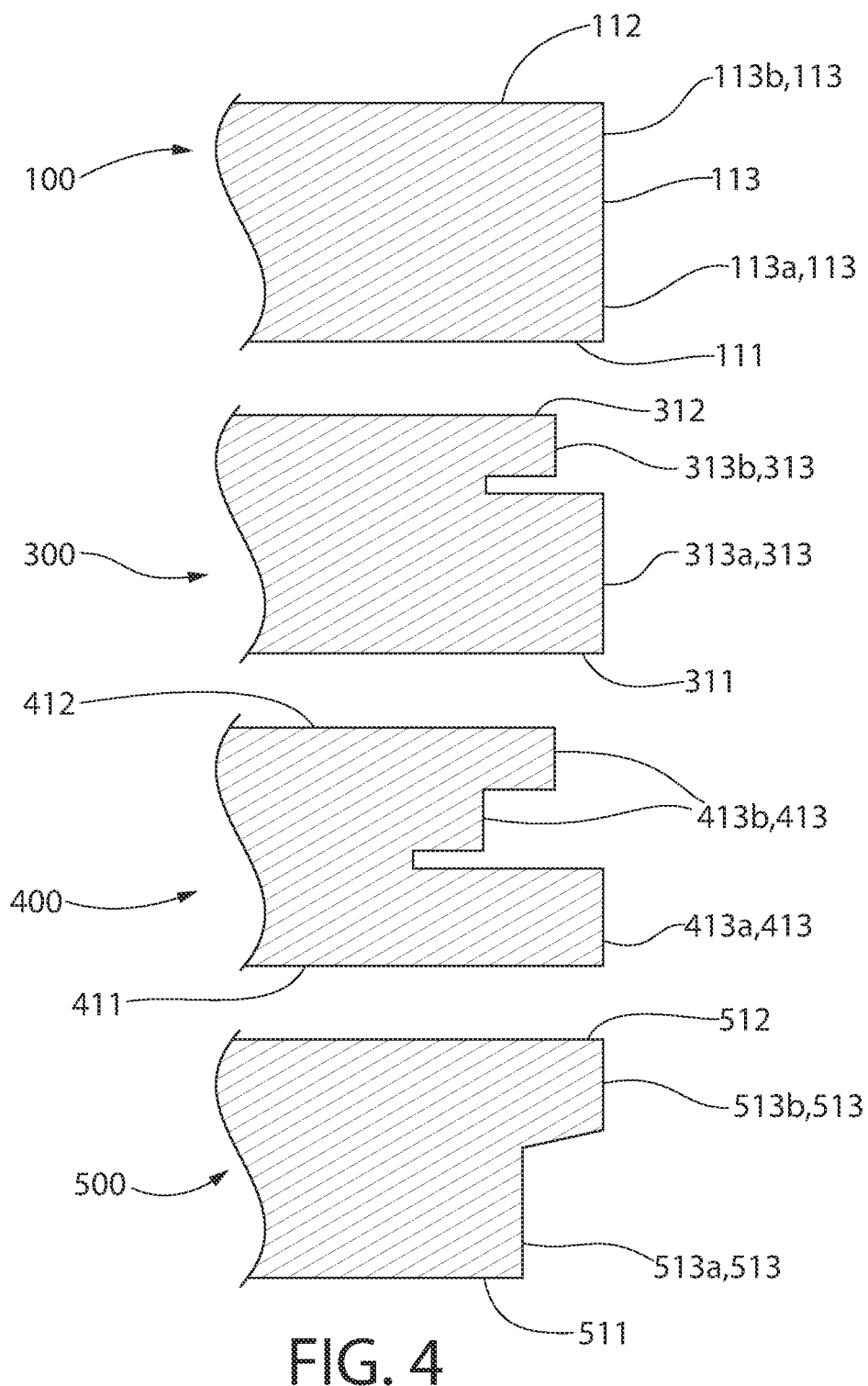
FIG. 4 is a cross-sectional close-up view of the edges of the building panels according to the present invention.
Figure 5:
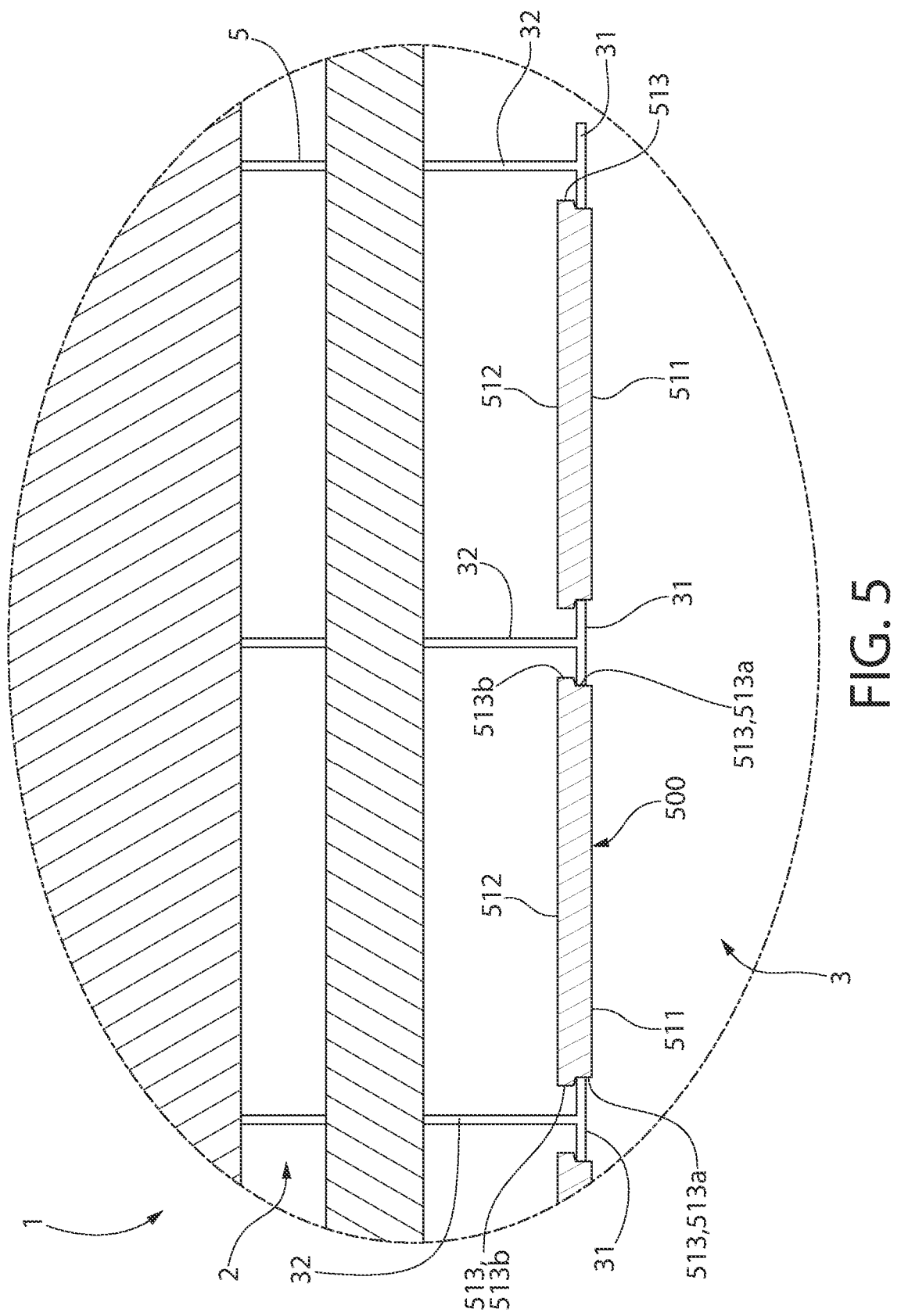
FIG. 5 is a close-up view of a ceiling system comprising the coated building panel according to an alternative embodiment of the present invention, the close-up view being the portion identified by oval V in FIG. 3.

Referring to FIG. 3, the present invention may further include a ceiling system, for example such as ceiling system 1, comprising one or more of the coated building panels 100. In certain embodiments, the coated building panels 100 are installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major surface 111 of the building panel 100 may face the active room environment 2 and the second major surface 112 of the building panel 100 may face the plenum space 3. The building panel 100 may be installed in any manner of variations. In a first variation, the building panel 100 is positioned entirely above the horizontal flange 31 of the support struts 5. In the first variation, at least a portion of the first major surface may be concealed from the active room environment 2 by the horizontal flange 31 because the horizontal flange 31 contacts the first major surface 111, thereby supporting it in the ceiling system 1. In the first variation, the entire side surface 113—including the upper portion 113a and the lower portion 113b—may be concealed from the active room environment 2 by the horizontal flange 311.

Figure 6:
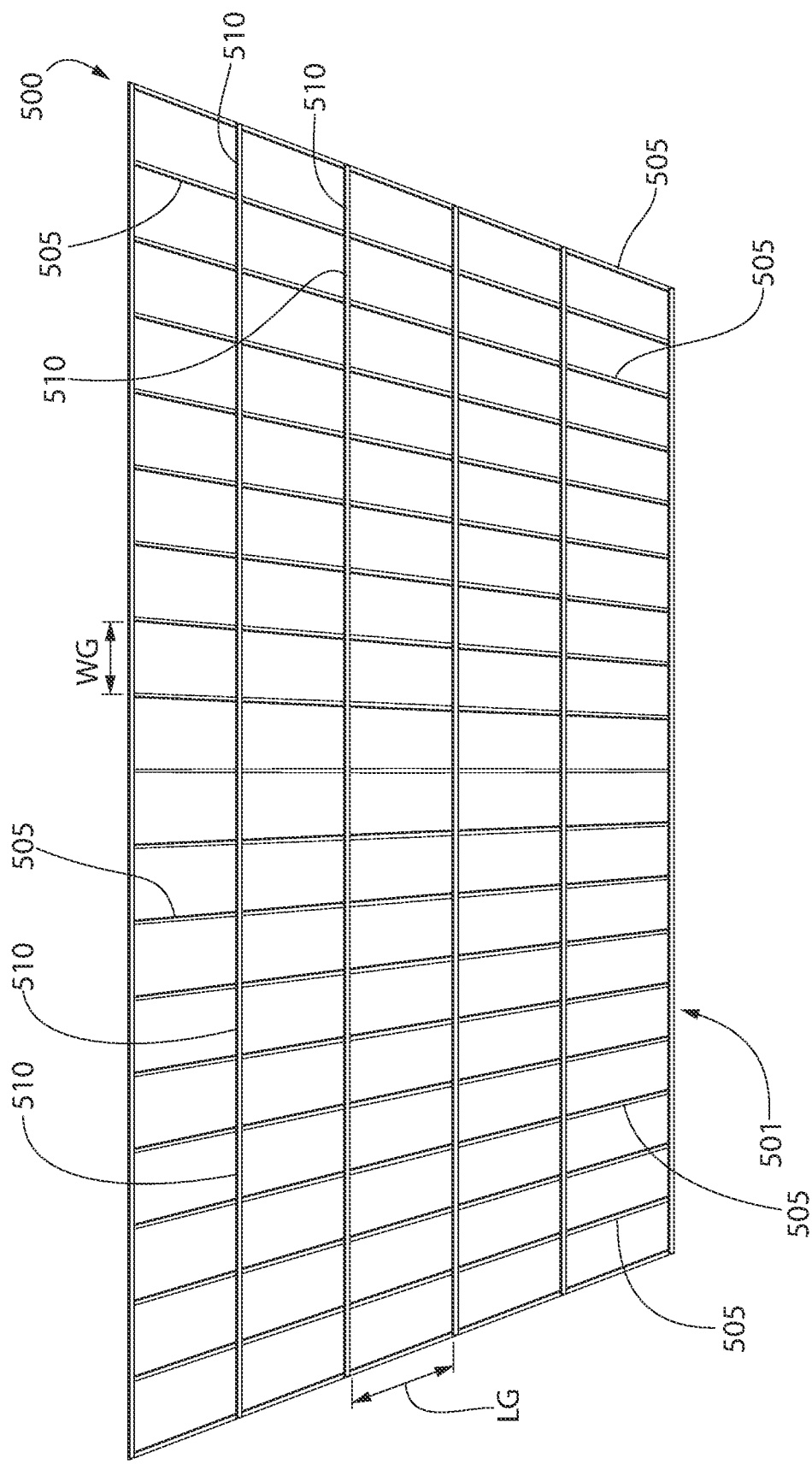
FIG. 6 is a perspective view of a support structure, in the form of a grid, that is used in a method of installing a surface covering system in accordance with an embodiment of the present invention.

Referring now to FIG. 6, an exemplary support structure 500 is provided. In the exemplified embodiment, the support structure 500 is a rectilinear grid 501 comprising main runners 510 and cross-runners 505. The main runners 510 are separated by a grid length LG while the cross-runners 505 are separated from one another by a grid width WG. The grid length LG is greater than the grid width GW in the exemplified embodiment. In one such embodiment, the main runners 510 are installed at approximately 48 in. on center while the cross runners 505 are installed 16 in. on center. The main runners 510 and cross-runners 505 may be formed of metal and can be rectangular beams, I-beams, L-beams, or T-grid, depending on environment and whether the surface covering system is to be a ceiling or a wall for a room environment. The support structure 500 may also take on other forms, such as wooden framing beams, masonry surfaces, or simply the surface itself that is intended to be covered.

Figure 7:
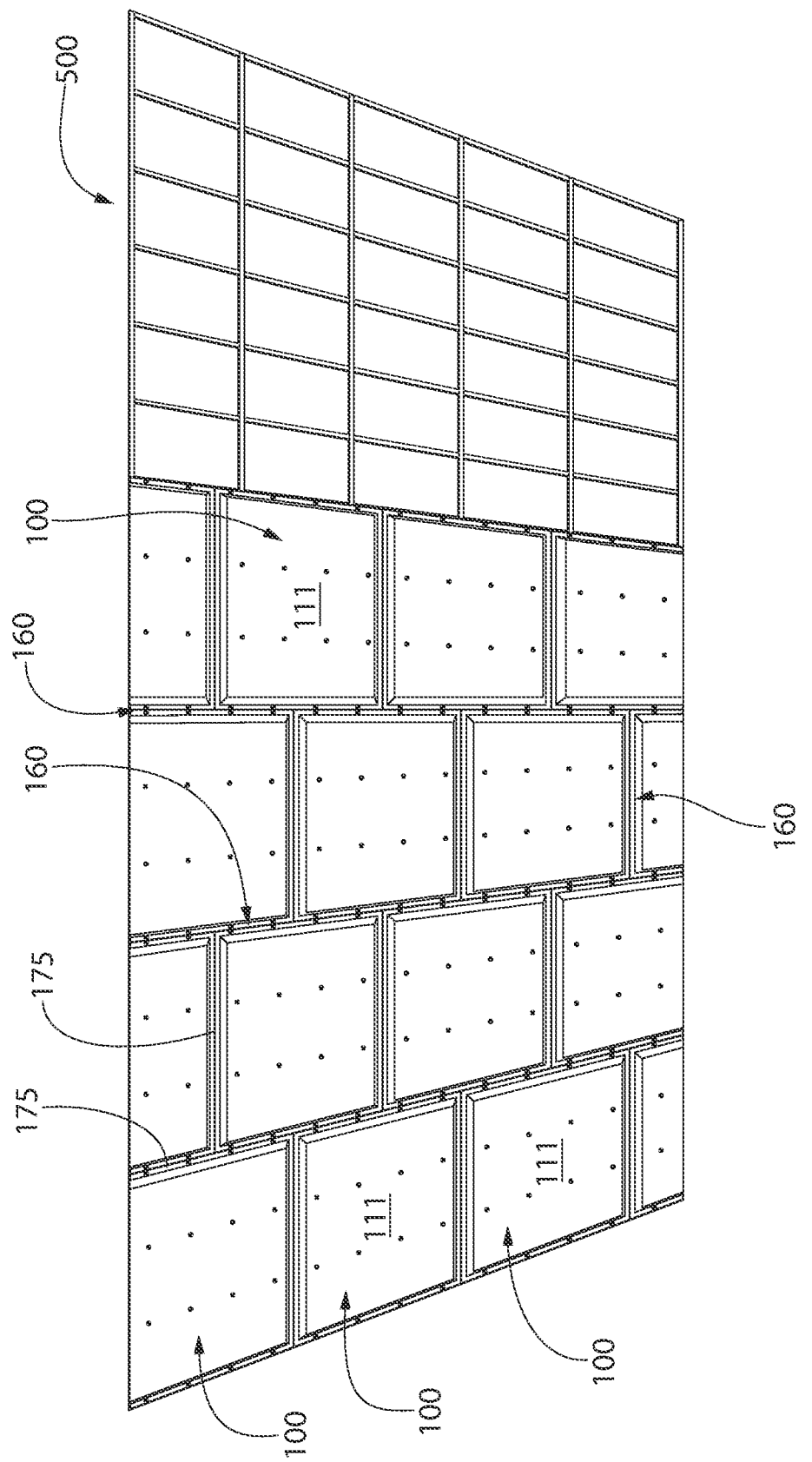
FIG. 7 is a perspective view of a plurality of the building panels being mounted to the support structure in accordance with an embodiment of the present invention.

FIG. 7 shows a non-limiting embodiment of the surface covering system, once the support structure 500 is installed (or is in existence), a plurality of the acoustical building panels 100 may be mounted to the support structure 500.

The acoustical building panels 100 are mounted to the support structure 500 so that the side edge surfaces of adjacent ones of the acoustical building panels 100 abut one another. Additionally, when the formation of a monolithic planar surface is desired, the first major surfaces 102 of the acoustical building panels 100 all lie in substantially the same plane.

The acoustical building panels 100 are mounted to the main runners 510 and the cross-runners 505 of the support structure 500 by fasteners 550, such as drywall screws. During the panel mounting step, the acoustical building panels 100 are positioned so that the side edge surfaces 107 of adjacent ones of the plurality of acoustical building panels 100 abut one another and define a seam 175 therebetween. The seam 175 may be a small gap, an interface between abutting side edge surfaces 107, or combinations thereof.

The surface coating 200 may be a water repellant coating. The surface coating 200 may comprise calcium carbonate, aluminum hydroxide, zinc borate, a rheology modifier, a defoamer, a dispersing agent, a whitening pigment, and an anionic wax emulsion. The coating 200 may be present on the upper surface 121 of the body 120 in an amount ranging from about 26 g/m$^2$ to about 220 g/m$^2$—including all amounts and sub-ranges there-between.

Various rheology modifiers may be used. Non-limiting examples include bentonite, polyacrylic based, polyurethane based, cellulose based, or combinations thereof. Hydroxyethylcellulose is an example of a cellulose based rheology modifier. In certain preferred embodiments, the rheology modifier is non-ionic. In certain embodiments, the rheology modifier is a non-ionic, water-soluble hydroxyethylcellulose surface-treated with glyoxal. The rheology modifier may be present in an amount of about 0.002% to about 0.08%, about 0.002% to about 0.04%, about 0.002% to about 0.01%, or about 0.002% to about 0.008%, by weight of the composition. In certain embodiments, the rheology modifier may be present in an amount of about 0.004%, by weight of the composition Various defoaming agents may be used. Defoaming agents are known in the art. Non-limiting examples of defoamer useful in the coating composition are multi-hydrophobic blend defoamers (for example FOAMASTER SA-3, commercially available from BASF Corporation); a polyether siloxane copolymer; polyalphaolefins formed from one or more monomers of 1-hexene, 1-heptene, 1-octene, 1-nonene, 1-decene, 1-undecene, 1-tridecene, 1-tetradecene, 1-pentadecene, 1-hexadecene, 1-octadecene, 1-heptadecene, and 1-nonadecene; a high density polymer selected from oxidized ethylene homopolymers, polyethylene homopolymers, and polypropylene homopolymers; a silicone oil, polypropylene glycol, and diethylenetriamine; and a non-ionic surfactant compound selected from polyether modified polysiloxane, polyethylene glycol oleate, and polyoxypropylene-polyoxyethylene copolymer—as well as mixtures thereof. In certain embodiments, the defoamer is a polyether siloxane copolymer which comprises fumed silica. In certain embodiments, the defoamer is present in an amount of about 0.08% to about 0.3%, about 0.1% to about 0.25%, or about 0.1% to about 0.2%, by weight of the composition. In certain embodiments, the defoamer is present in an amount of about 0.16%, by weight of the composition.

Various dispersing agents may be used. Non-limiting examples of dispersing agent which may be used is a nonionic dispersant, tetrasodium pyrophosphate, sodium polyacrylate based dispersants, or combinations thereof. In certain embodiments, the nonionic dispersant is a nonionic dispersant copolymer. In certain embodiments, the dispersing agent is Tego Dispers 747 W (Evonik Operations GmbH). In certain embodiments, the dispersing agent is present in an amount of about 1.0% to about 3.0%, about 1.0% to about 2.0%, or about 1.0% to about 1.5%, by weight of the composition.

Various pigments may be used. Non-limiting examples of pigments useful within the coating are organic dye, titanium dioxide ($TiO_2$), calcium carbonate, alumina trihydrate, and diatomaceous earth. In certain embodiments, the pigment is a whitening pigment. In certain embodiments, the pigment is present in an amount of about 15% to about 30%, about 18% to about 25%, or about 18% to about 22%, by weight of the composition.

Non-limiting anionic wax emulsion useful comprise paraffin, polyethylene, or a combination thereof. In certain embodiments, the anionic wax emulsion comprises paraffin and polyethylene. In certain embodiments, the anionic wax emulsion is present in an amount of about 5% to about 30%, about 5% to about 20%, or about 7% to about 15%, by weight of the composition.

The surface coating 200 may comprise a binder. Non-limiting examples of binder useful for the coating composition include anionic derivatives of a polyvinyl acetate homopolymer. In certain embodiments, the anionic derivative is a carboxylated polyvinyl acetate homopolymer. The binder may be present in an amount ranging from about 1 wt. % to about 25 wt. % based on the total weight of the surface coating 200—including all values and sub-ranges there-between. In certain embodiments, the binder is present in an amount ranging from about 10 wt. % to about 25 wt. %, about 10 wt. % to about 20 wt. %, or about 10 wt. % to about 18 wt. %, based on the total weight of the surface coating 200.

The panel body 120 may be formed according to a standard wet-laid process that uses an aqueous medium (e.g., liquid water) to transport and form the body components into the desired structure. The basic process involves first blending the various body ingredients (e.g., fibers, binder, filler, etc.) into an aqueous slurry—(i.e., the wet-state), transporting the slurry to a head box forming station, and distributing the slurry over a moving, porous wire web into a uniform mat having the desired size and thickness. Water is removed, and the mat is then dried (i.e., the dry-state). The dried mat may be finished into the body by slitting, punching, coating and/or laminating a surface finish to the panel body 120.

The coating 200 may be added to the panel body 120 by any means known in the art. non-limiting examples include by spray coating, roll coating, dip coating, and a combination thereof—followed by drying at a temperature ranging from about 60° C. to about 300° C.—including all values and sub-ranges there-between. For example, the coating 200 may be sprayed onto the panel body 120. The body 120 and surface coating 200 may then be heated at an elevated temperature ranging from about 60° C. to about 300° C.—including all values and sub-ranges there-between—to dry the body 120 having the coating 200.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Panels were painted and coated with coating composition of either comparative example 1 or example 1. Table 1 shows the compositions of comparative example 1 or example 1. Panels were then visually observed for visual imperfections and stability. Table 2 shows the results of such analysis.

Water was used as the solvent. Opacifier in the form of calcium carbonate was utilized from commercially available Omyaflow® (Omya International AG) or in combination with purified calcium carbonate. Rheology modifier used was a non-ionic, water soluble hydroxyethylcellulose surface treated with glyoxal (Ashland Specialty Chemical). Defoamer used was a polyether siloxane (Evonik Operations GmbH). Dispersant A was an anionic aqueous solution of copolymer commercially available as Tego® Dispers 747 W (Evonik Operations GmbH). Dispersant B was a sodium polyacrylate (Nalco Co.). Titanium dioxide was used as a whitening pigment. Aluminum hydroxide was used a smoke suppressor/flame retardant. Zinc borate was used to prevent rot, decay, and mold. Binder used was a carboxylated polyvinyl acetate homopolymer (Dow). The non-ionic silane-siloxane emulsion was commercially available from Dow. The anionic paraffin-polyethylene wax emulsion used was commercially available from Micro Powders Inc.

TABLE 1

| Material Type | Comp. Ex. 1 | Ex. 1 |
| --- | --- | --- |
| Solvent | 10.0 | 16.2 |
| Opacifier | 46.2 | 30.8 |
| Rheology modifier | 0.05 | 0.004 |
| Defoamer | 0.04 | 0.16 |
| Dispersing A | 0 | 1.36 |
| Dispersant B | 0.2 | 0 |
| Whitening Pigment | 17.4 | 19.6 |
| Smoke suppressor/Flame retardant | 7.0 | 8.1 |
| Prevents rot, decay and mold | 1.9 | 1.8 |
| Binder | 14.3 | 14.9 |
| Non-ionic Silane/siloxane emulsion blend | 2.9 | 0 |
| Anionic Paraffin/polyethylene wax emulsion | 0 | 7.0 |

Both coating compositions were applied onto wall substrates of different sizes. Results are summarized in Table 2.

TABLE 2

| | Comparative Ex. 1 | Example 1 |
| --- | --- | --- |
| 2 ft × 2 ft Panel Size | Stable, no streaks | Stable, no streaks |
| 4 ft × 8 ft Panel Size | Unstable, visible streaks | Stable, no streaks |

As shown in Table 2, while both coatings produced stable coating with minimal or no visible streak when applied to small panels, the comparative composition was unstable and produced a splotchy visual, or heavy streaks, on the finished product of larger panels. In comparison, the composition of example 1 provided for stable coating with minimal or no visible streak when applied to any sized panel. The coating of the present invention is able to impart the desired aesthetic properties while surprisingly not hindering the acoustical performance of the panel.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A building panel coating composition comprising:
   calcium carbonate;
   aluminum hydroxide;
   zinc borate;
   a rheology modifier;
   a defoamer;
   a dispersing agent;
   a whitening pigment, and an anionic wax emulsion; and
   wherein the rheology modifier is non-ionic, water-soluble hydroxyethylcellulose surface-treated with glyoxal.

2. The building panel coating composition of claim 1 wherein the rheology modifier is present in an amount of about 0.002% to about 0.08% by weight of the composition.

3. The building panel coating composition of claim 1 wherein the defoamer is a polyether siloxane copolymer.

4. The building panel coating composition of claim 3 wherein the polyether siloxane copolymer comprises fumed silica.

5. The building panel coating composition of claim 1 wherein the defoamer is present in an amount of about 0.08% to about 0.3% by weight of the composition.

6. The building panel coating according to claim 1, wherein the dispersing agent is a nonionic dispersant copolymer.

7. The building panel coating according to claim 1, wherein the dispersing agent is present in an amount of about 1.0% to about 3.0% by weight of the composition.

8. The building panel coating composition according to claim 1, wherein the whitening pigment is titanium dioxide.

9. The building panel coating composition according claim 1, wherein the anionic wax emulsion comprises paraffin, polyethylene, or a combination thereof, wherein the anionic wax emulsion is present in an amount of about 5% to about 30% by weight of the composition.

10. A building panel comprising:
    a body having an upper surface opposite a lower surface and at least one side surface extending between the upper surface and the lower surface;
    a water repellant coating adjacent at least to the upper surface and lower surface, the water repellant coating comprising a building panel coating comprising:
    calcium carbonate;
    aluminum hydroxide;
    zinc borate;
    a rheology modifier;
    a defoamer;
    a dispersing agent;
    a whitening pigment, and an anionic wax emulsion; and
    wherein the building panel has a length and a width, the length is at least 6 ft and the width is at least 3 ft.

11. The building panel according to claim 10, wherein the body comprises any one of fiberboard, wood, metal, brick, plastic, fabric, fibrous sheet, glass, ceramic, concrete, plastic film/sheet, paper, fiberglass, mineral fiber sheet, drywall.

12. The building panel according to claim 10, wherein the length of the building panel is at least 3.5 ft and the width of the building panel is at least 7 ft.

13. A coating composition comprising:
    a liquid carrier; and
    a solid blend comprising:
    calcium carbonate;
    aluminum hydroxide;
    zinc borate;
    a rheology modifier;
    a defoamer;
    a dispersing agent;
    a pigment;
    and an anionic wax emulsion; and
    wherein the liquid carrier is present in an amount ranging from 5 wt. % to 45 wt. % based on the total weight of the coating composition.

14. The coating composition of claim 13 wherein the rheology modifier is non-ionic, water-soluble hydroxyethylcellulose surface-treated with glyoxal.

15. The coating composition of claim 13 wherein the defoamer is a polyether siloxane copolymer.

16. The coating composition according to claim 13, wherein the dispersing agent is a nonionic dispersant copolymer present in an amount of about 1.0% to about 3.0% by weight of the solid blend.

17. The coating composition according to claim 13, wherein the pigment is titanium dioxide.

18. The coating composition according to claim 13, wherein the anionic wax emulsion comprises paraffin, polyethylene, or a combination thereof.

19. A method of coating a building panel substrate comprising:
    a) applying the coating composition according claim 13 to a substrate; and
    b) drying the coating composition such that the liquid carrier is removed from the substrate.

* * * * *